United States Patent Office 2,752,598
Patented July 3, 1956

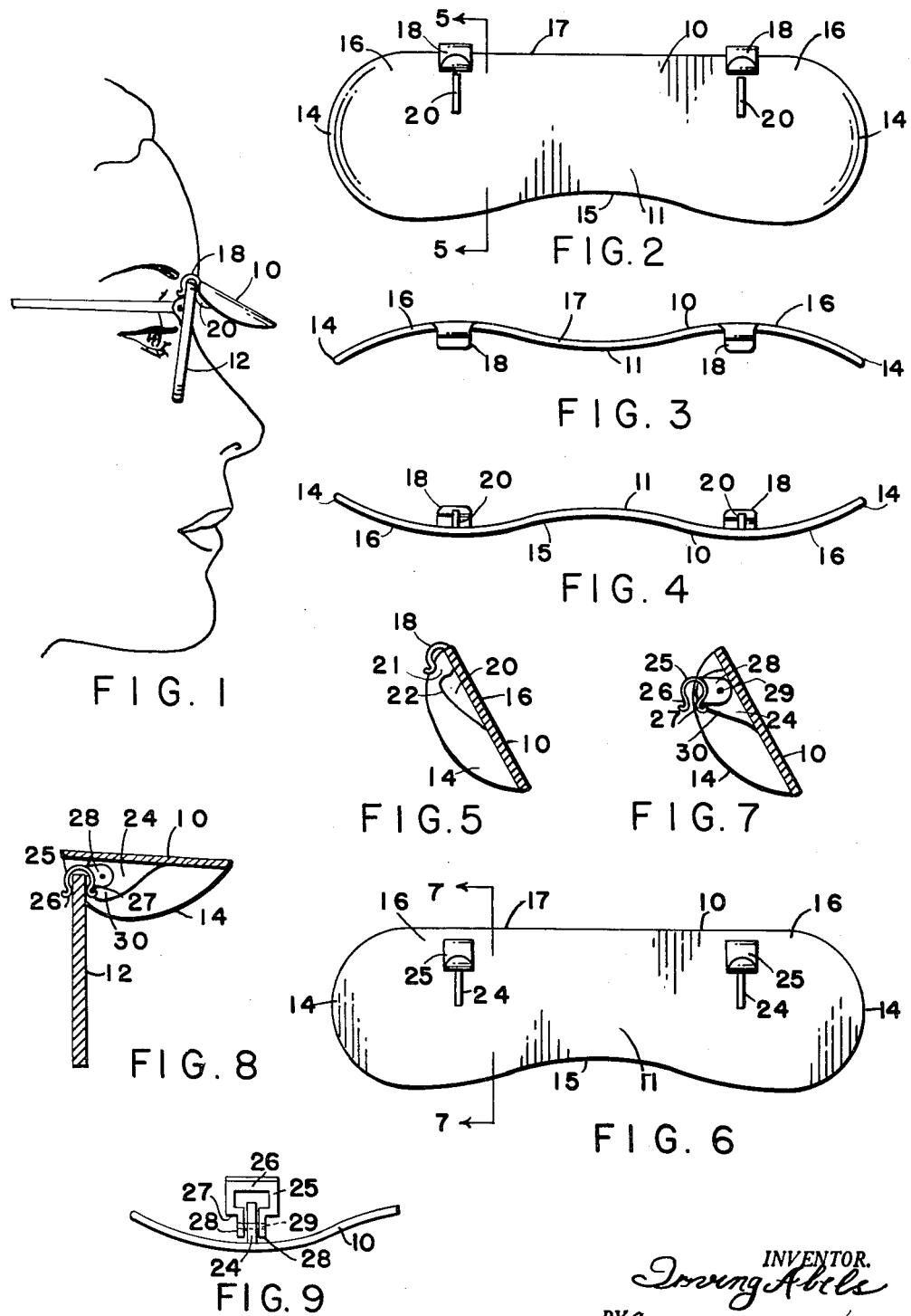

2,752,598
EYE-SHADE FOR ATTACHMENT TO SPECTACLES

Irving Abels, Anaheim, Calif.

Application November 3, 1953, Serial No. 389,958

3 Claims. (Cl. 2—13)

This invention relates to eye-shades or glare-reducers, and particularly relates to an eye-shade for attachment to glasses or spectacles. While useful for automobile drivers and for persons engaged in many other activities, my eye-shade is particularly useful for persons who are reading or writing or working under overhead light.

To a reader, writer, typist, machinist, and persons using their eyes in conditions requiring good light for acute vision, colored glasses, either attached to spectacles or in the form of ground Crookes lenses, are seldom desirable, as such persons do not wish the light reflected from the object which they are viewing to be either obscured or discolored. It may however be desirable to cut off direct light from overhead or reflected glare from areas of the viewed object not under instant scrutiny. Such people generally have their heads inclined forward and their eyes cast down. To prevent heavy eyeshades from slipping, they may have to be so tight upon the head as to be uncomfortable; if supported on spectacles, the spectacles may slip annoyingly under the weight. Spectacles being many sizes and shapes, anti-glare attachments for spectacles have hitherto generally embodied complex and relatively heavy parts to make them adjustable for width and/or for slope.

It is an object of my invention to provide an eye-shade attachment for spectacles which is so light in weight as to be practically unnoticeable in that respect to the wearer.

It is a further object of my invention to provide an eye-shade which may be attached conveniently to spectacles of a wide range of shapes and sizes.

Another object of my invention is to provide an eye-shade attachment for spectacles which may be adjusted within limits to a slope or angle relative to the spectacles to which it is temporarily attached, but which is limited to a minimum acute angle relative to the spectacles so that the wearer's vision is never entirely obstructed by it, the wearer being always able to see unobstructedly through the lower part of his spectacle lenses.

Still another object of my invention is to provide an eye-shade attachment which is equally useful for desk or bench work or for driving in an automobile, either by day or by night.

In the accompanying drawing illustrative of two forms in which my invention may, by way of example, be embodied:

Fig. 1 is a side elevational view showing a preferred embodiment of my invention as worn attached to spectacles;

Fig. 2 is a rear elevational view on an enlarged scale;

Figs. 3 and 4 are respectively top edge and bottom edge views of the eye-shade shown in Fig. 2;

Fig. 5 is a sectional view on the line of section 5—5 of Fig. 2;

Fig. 6 is a rear elevational view of a modified form of eye-shade also embodying the principles of my invention;

Fig. 7 is a sectional view on the line of section 7—7 of Fig. 6;

Fig. 8 is another similar sectional view, the eye-shade being shown attached to spectacles in a raised position, and Fig. 9 is a fragmentary view from above of the modification of Figs. 5.–8.

Considering now the details of the drawing, the preferred embodiment of my invention shown in Figs. 1 to 5 comprises a strip 10 of light-weight flexible and springy material, for which a large number of sheet plastic materials are suitable. For some usages, when it is desired to cut off overhead light entirely, the strip 10 may be opaque, or may be painted to give it opacity, but preferably it is transparent plastic and contains dye to color it so as to filter out objectionable light-rays. The strip 10 is preferably curved, as shown in Figs. 3 and 4, curving, inwardly toward the spectacles at the bridge 11, then outwardly opposite the spectacle lenses 12, and then curving inwardly again at its ends 14, to cut off sidelights. The lower edge 15 of the strip 10 may curve upwardly at the center of the strip, to narrow the bridge 11, leaving full-width lens-covering portions 16 adjacent the ends.

Adjacent the upper edge 17 of the strip 10 are hooks 18 at approximately the center lines of the lens-covering portions 16, and best illustrated in Figs. 1 and 5. The hooks 18 are preferably of the same springy material as the strip 10, and may be mere crook extensions of the strip. By their springiness they are adapted to hook over and grip the upper rims of the spectacle lenses 12. By the springiness of the whole strip 10, and the above-described slight curvature of the strip, the strip may be slightly flattened to extend the distance between the hooks 18 or bent to increased curvature to lesser said distance. Thus the hooks 18 may be placed to advantage on spectacles of varied widths and shapes, without necessitating manufacture of eye-shades of like variety of widths. The slight narrowing and curved formation of the bridge 11 assists the strip 10 in flexing between the hooks 18, the hooks remaining extended always in the same direction, rather than turning inwardly toward the bridge 11 or outwardly toward the ends 14.

Extending downwardly from the hooks 18, on the inner or spectacle-side, surface of the strip 10, are short ribs 20, against which the hooks 18 press the engaged spectacle lenses. The hooks 18 and ribs 20 thus form opposed jaws of recesses 21, into which the upper rims of the lenses 12 enter. The ribs 20 have curved shoulders 22 as shown in Figs. 1 and 5 to provide easy entrances into the recesses 21, and extend transversely of the lense-covering portions 16 for only a short distance so as not to interfere with the wearer's vision. It will be obvious from Figs. 1 and 5 that the lenses 12 may be pressed into the recesses 21 to a greater or lesser extent. Whether a lens is entered into the recess 21 to the fullest possible extent, as shown in Fig. 1, springing the hook 18 away from the rib 20, or merely pushed into the opening of the recess between the end of the hook and the shoulder 22, the shoulder 22 abuts the outer surface of the lens and limits the acuteness of the angle or slope of the strip 10 relatively to the spectacles. The permitted acuteness of the angle is greatest when the lenses are pushed fully into the recesses 21. The ribs 20 also reinforce the light plastic material of the strip 20 at the points of attachment and stress of the hooks 18.

In Figs. 6, 7, 8 and 9, I have shown a modified form of my invention in which ribs 24, in shape and in spaced position similar to the ribs 20, are disposed adjacent to but slightly below the upper edge of the strip 10. Spring hooks 25 having two opposed jaws 26 and 27 are secured by one of the jaws to hinge blocks 28 which are pivotally connected by pins 29 to the ribs 24. The shoulders 30 of the ribs 24 are more pronounced than the shoulders 22 of the ribs 20, so as to make slope-limiting contact with the spectacle lenses below the hooks 25. This embodiment of my invention, when the strip 10 is of colored transparent plastic is especially suitable for night driving in an automobile, being quickly adjustable to a raised position giving unimpaired vision or to a lowered position to cut off the glare of approaching lights. On the other hand, the previously described embodiment of my invention may equally well be used for night driving, the wearer holding his head erect to obtain full vision, and bowing his head slightly to interpose the eye-shade between his pupils and oncoming lights.

I claim:

1. An eyeshade for attachment to spectacles comprising: a strip of light plastic material; spaced flexible hooks adjacent one edge of said strip adapted to engage the upper rims of individual lenses of spectacles; and short ribs mounted on said strip and extending downwardly in spaced relation from said hooks adapted to engage the upper outer surfaces of said lenses said ribs having curved shoulders spaced from and opposed to said hooks and defining recesses varying in size with the flexing of said hooks and the point of contact of said lenses with said shoulders so as to permit a variable degree of entrance of said lenses therebetween for holding said strip at an outward angle from said lenses.

2. An eyeshade for attachment to spectacles comprising: a strip of light material; a pair of short ribs extending transversely of said strip from positions adjacent one edge thereof, said ribs being spaced so as to engage the upper outer surfaces of individual lenses of said spectacles; and a hook pivoted upon each of said ribs for engaging the upper rims of the respective lenses, said ribs having curved shoulders adapted to frictionally engage said lenses for holding said strip at an outward angle and for limiting the permissible downward slope of said strip relative to said lenses.

3. An eyeshade for attachment to spectacles comprising: a strip of springy material colored so at to reduce the passage of light therethrough, and flexible so as to permit variation in the spacing of the hereinafter mentioned hooks; a pair of hooks adjacent one edge of said strip for engaging the upper rims of lenses of said spectacles, said hooks being spaced for engagement with respective lenses; and short ribs mounted on said strip and extending in spaced relation from said hooks transversely of said strip and adapted to abut the outer surfaces of said lenses for holding said strips at an outward inclination to said lenses said ribs having curved shoulders in spaced opposition to a jaw of said hooks cooperating with said hooks and adapted to engage said lenses frictionally in selective positions extending from adjacent said strip toward the open end of said hook.

References Cited in the file of this patent

UNITED STATES PATENTS

| 1,166,493 | Thompson | Jan. 4, 1916 |
| 1,688,775 | Baker | Oct. 23, 1928 |
| 2,388,626 | Wilson | Nov. 6, 1945 |
| 2,544,221 | Creighton | Mar. 6, 1951 |
| 2,640,988 | Poole | June 9, 1953 |

FOREIGN PATENTS

| 854,233 | France | Jan. 4, 1940 |